J. T. HUDGINS.
PIPE COUPLING.
APPLICATION FILED AUG. 25, 1914.
1,228,323.
Patented May 29, 1917.
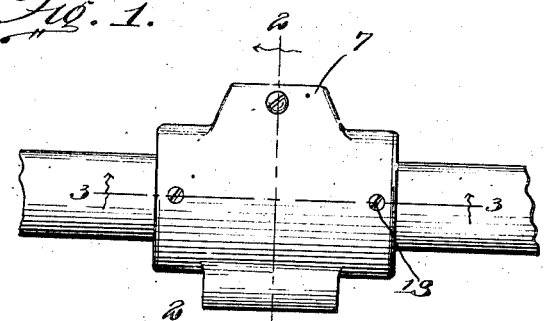
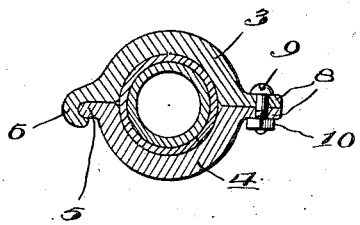
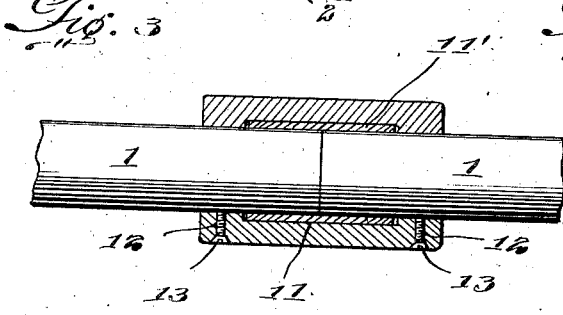
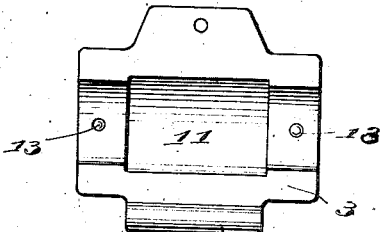
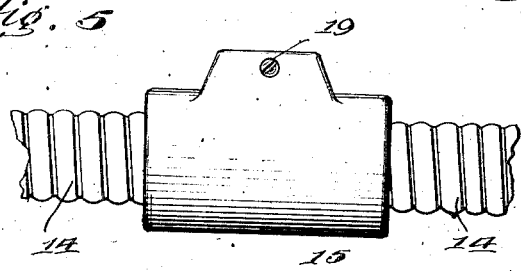
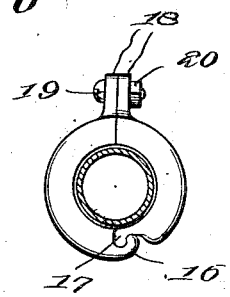
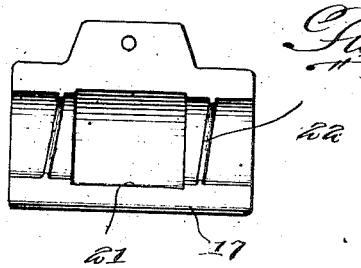
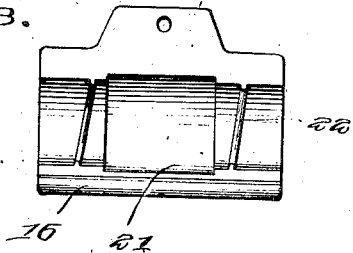
Inventor
John T. Hudgins.
Witnesses
Frederick L. Fry.
By Victor J. Evans.
Attorney

UNITED STATES PATENT OFFICE.

JOHN T. HUDGINS, OF NORFOLK, VIRGINIA, ASSIGNOR OF ONE-HALF TO EDWARD SAWYER, OF NORFOLK, VIRGINIA.

PIPE-COUPLING.

1,228,323.  Specification of Letters Patent.  Patented May 29, 1917.

Application filed August 25, 1914.  Serial No. 858,527.

*To all whom it may concern:*

Be it known that I, JOHN T. HUDGINS, a citizen of the United States, residing at Norfolk, in the county of Norfolk and State of Virginia, have invented new and useful Improvements in Pipe-Couplings, of which the following is a specification.

The present invention relates to improvements in couplers for joining or connecting the ends of pipes and sustaining the same in alinement.

In carrying out my invention it is my purpose to provide a coupler, primarily adapted for connecting two electric conduit pipes, which shall comprise two members which shall be easily associated to embrace the ends of the pipes and sustain the said pipes in longitudinal alinement, and at the same time shall seal the ends of the said pipes to prevent the admission of dirt or water therebetween.

It is also my purpose to provide a coupler for this purpose which shall comprise a split sleeve having a knuckle joint connection, the members of the sleeve being centrally recessed to provide an interior pocket for the reception of a split compressible ring which embraces the pipes at the ends thereof, the section of the coupler, opposite the knuckle joint being formed with extending flanges, securing means engaging the flanges for locking the sections of the coupler, and the said sections being further provided with pipe engaging means, independent of the compressible ring for preventing the separation of the pipe members when engaged by the coupler.

I further aim to provide a coupler for the purpose stated which shall be of a simple construction, cheap to manufacture, easily applied to or removed from the ends of the pipes, and which will perform the functions for which it is devised with efficiency and with accuracy.

With the above recited objects in view, and others which will appear as the nature of the improvement is more fully understood, the improvement resides in the construction, combination and arrangement of parts set forth in the following specification and falling within the scope of the appended claim.

In the drawings:

Figure 1 is a plan view illustrating two conduit pipes having their ends connected by my improved coupler, Fig. 2 is a sectional view approximately on the line 2—2 of Fig. 1, Fig. 3 is a longitudinal sectional view on the line 3—3 of Fig. 1, the pipe sections as well as the binding screws being in elevation, Fig. 4 is a plan view looking toward the inner face of one of the coupler sections, Fig. 5 is a view illustrating the ends of the flexible metallic conductor pipe connected by my improvement, Fig. 6 is an end view of the same, Fig. 7 is a view looking toward the inner face of one of the coupler members illustrated in Figs. 5 and 6, Fig. 8 is a similar view of the second coupler member.

Referring now to the drawing in detail, 1—1 designate the ends of two electric conduit pipes which are connected by my improved coupling.

The coupler is generally designated by the numeral 2, and comprises a sectional sleeve having an inner bore of a size to snugly receive the pipe ends. The coupler includes a pair of members 3, 4 respectively, the said members having a knuckle joint connection upon one of their ends. The knuckle is formed upon the coupler a suitable distance from the ends thereof, the male member 5 being provided upon the lower section 4, while the female or hook member 6 is formed upon the opposite or upper member 3 of the coupler. The members 3 and 4, at their ends opposite that provided with the knuckle joint have outwardly extending flanges 7 which are provided with registering openings 8 through which passes a screw or bolt 9, a nut 10 engaging the threaded end of the member 9 to lock the sections of the coupler.

The bore of the split or sectional sleeve comprising the coupler, is centrally formed with an elongated depression providing a pocket 11 for the reception of a split compressible ring or washer member 11′. The split ring 11, it will be noted, surrounds the meeting ends of the pipe sections 1—1, and the said ring being of a length corresponding with the length of the elongated pocket 11 also engages with a considerable portion of the pipes beyond their contacting ends, and the sections of the coupler being forced tightly together by the members 9 and 10, the compressible member 11' effectively prevents the entrance of moisture, dirt, etc., to the pipe at the ends thereof.

In order to more effectively sustain the pipe sections in longitudinal alinement and also to more effectively bind the said sections with the coupler, I provide the section 4 of the coupler with centrally disposed threaded openings 12—12 arranged adjacent its opposite ends and to the opposite sides of the pocket 11. Passing through and engaging with the threads of the openings 12 are binding bolts 13 which in the present instance, are in the nature of headed screws, the said heads being received within countersinks that communicate with the openings 12 to provide a smooth undersurface for the coupler. The heads of the members 13 have transverse slots to receive the bit of a screw driver, whereby the same may be adjusted.

In Figs. 5 to 8 the coupler is primarily adapted for connecting the ends of a flexible metallic conduit 2. Such conduits are in the nature of fluted or corrugated sections and designated by the numerals 14—14. The coupler 15 is in the nature of a centrally split sleeve, the sections of which being connected by a knuckle joint. The joint is provided by forming one of the edges of one of the sections with an inwardly extending tongue 16, and by recessing or channeling the second section adjacent its coöperating edge to provide the same with a rib 17 to engage the hook 16. The opposite edges of the members are provided with centrally disposed longitudinally extending flanges or lips 18—18 having openings to receive the headed screw 19 which is provided with a nut 20. The sections are centrally formed with an elongated circular depression 21—21, which provides a pocket for the reception of a split tubular compressible member similar to the ring 11'. The bore of the coupler 15, to the opposite sides of the pocket is formed with angularly disposed teeth or ribs 22 which are adapted to engage the pipe sections 14 between the corrugated members thereof.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

In combination a pair of semi-cylindrical members each formed with an integral lip, one of said members being formed diametrically opposite its lip with an inwardly extending tongue and the other of said members being formed with a rib in diametrical alinement with its lip, the first-named member having a shoulder formed by its tongue disposed flush with its lip, said members adapted to be coupled together and being so positioned that the surface of the coupled members adjacent thereto forms part of a cylindrical surface, said tongue being adapted to be hooked onto said rib and engaging said shoulder to cause said lips to contact, each of said members being formed internally with a pair of semi-cylindrical disposed threads, the threads of said members being coupled to form completely cylindrical threads, and means for securing said lips together.

In testimony whereof I affix my signature in presence of two witnesses.

JOHN T. HUDGINS.

Witnesses:
E. EDMONSTON, Jr.,
WM. J. KOERTH.